United States Patent

Chang et al.

[15] 3,689,902

[45] Sept. 5, 1972

[54] CYLINDRICAL MAGNETIC DOMAIN DECODER

[72] Inventors: Hsu Chang, Yorktown Heights; George E. Keefe, Montrose; Yeong S. Lin, Mount Kisco; Laurence L. Rosier, Amawalk, all of N.Y.

[73] Assignee: International Business Machines Corporation, Armonk, N.Y.

[22] Filed: June 30, 1971

[21] Appl. No.: 158,232

[52] U.S. Cl. ........................340/174 TF, 340/174 SR

[51] Int. Cl. ..........................G11c 11/14, G11c 19/00

[58] Field of Search ................................340/174 TF

[56] References Cited

UNITED STATES PATENTS

| | | | |
|---|---|---|---|
| 3,516,077 | 6/1970 | Bobeck et al. | 340/174 TF |
| 3,530,446 | 9/1970 | Perneski | 340/174 |
| 3,543,252 | 11/1970 | Perneski | 340/174 |
| 3,618,054 | 11/1971 | Bonyhard | 340/174 |

OTHER PUBLICATIONS

IBM Technical Disclosure Bulletin, " Improvement of Data Rate In Cylindrical Domain Devices," by Genovese et al., Vol. 13 No. 11, 4/71

Scientific American " Magnetic Bubbles" by Bobeck et al, p. 78- 90, 6/71

*Primary Examiner*—Stanley M. Urynowicz, Jr.
*Attorney*—Jackson E. Stanland

[57] ABSTRACT

A decoder for cylindrical magnetic domain shift registers having means to clear the information from selected registers thus enabling new information to be written into those registers. The decoder is incorporated into $2^N$ closed loop shift registers and uses only a small part of the storage area of the magnetic sheet in which domains exist. It is activated by 2N control lines (N pairs). Depending upon the activation of the decoder, the information in a selected shift register is passed to a clear means which sends it into one of two paths depending upon the activation of the clear means. One path brings the information to a detector for destructive readout, while the other path brings the information to a domain splitter. The domain splitter splits the input domains into two parts, one of which propagates to the detector while the other returns to the proper shift register. Thus, nondestructive readout (NDRO) or destructive read-out (DRO) is provided depending upon the activation of the clear means.

20 Claims, 5 Drawing Figures

INVENTORS
HSU CHANG
GEORGE E. KEEFE
YEONG S. LIN
LAURENCE L. ROSIER

BY J. E. Scanlan
AGENT

FIG. 4
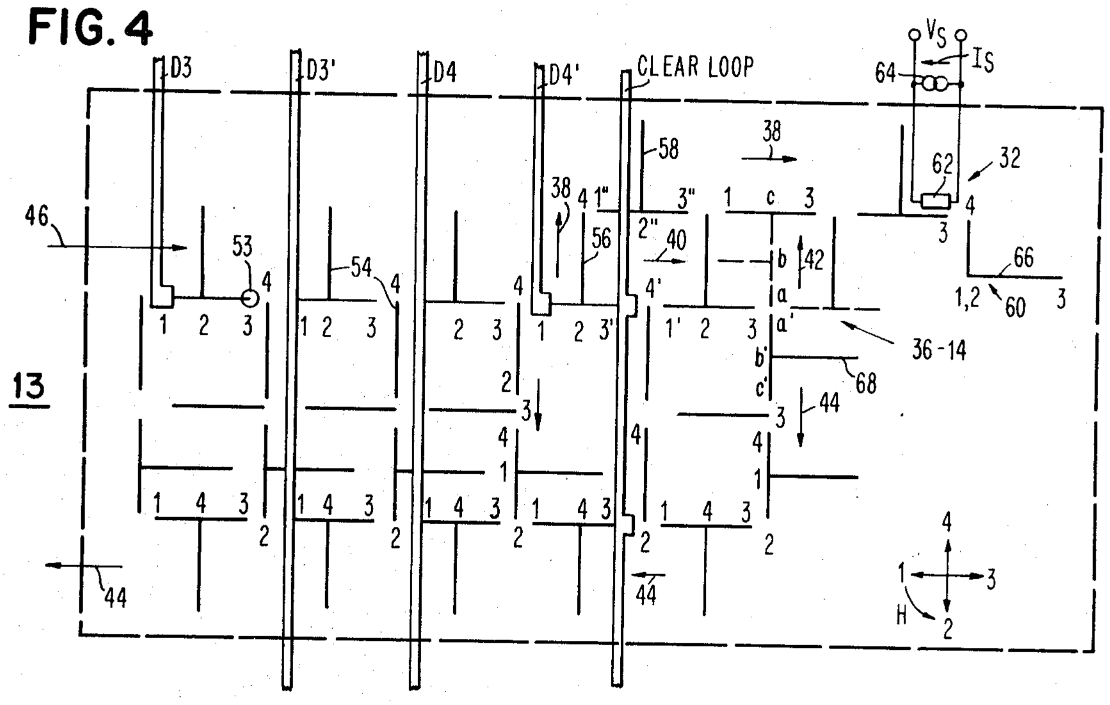
FIG. 3
| BINARY CODED DECIMAL | | | | | | | | REG. # |
|---|---|---|---|---|---|---|---|---|
| D1 | D1' | D2 | D2' | D3 | D3' | D4 | D4' | |
| 0 | 1 | 0 | 1 | 0 | 1 | 0 | 1 | 1 |
| 0 | 1 | 0 | 1 | 0 | 1 | 1 | 0 | 2 |
| 0 | 1 | 0 | 1 | 1 | 0 | 0 | 1 | 3 |
| 0 | 1 | 0 | 1 | 1 | 0 | 1 | 0 | 4 |
| 0 | 1 | 1 | 0 | 0 | 1 | 0 | 1 | 5 |
| 0 | 1 | 1 | 0 | 0 | 1 | 1 | 0 | 6 |
| 0 | 1 | 1 | 0 | 1 | 0 | 0 | 1 | 7 |
| 0 | 1 | 1 | 0 | 1 | 0 | 1 | 0 | 8 |
| 1 | 0 | 0 | 1 | 0 | 1 | 0 | 1 | 9 |
| 1 | 0 | 0 | 1 | 0 | 1 | 1 | 0 | 10 |
| 1 | 0 | 0 | 1 | 1 | 0 | 0 | 1 | 11 |
| 1 | 0 | 0 | 1 | 1 | 0 | 1 | 0 | 12 |
| 1 | 0 | 1 | 0 | 0 | 1 | 0 | 1 | 13 |
| 1 | 0 | 1 | 0 | 0 | 1 | 1 | 0 | 14 |
| 1 | 0 | 1 | 0 | 1 | 0 | 0 | 1 | 15 |
| 1 | 0 | 1 | 0 | 1 | 0 | 1 | 0 | 16 |
FIG. 5
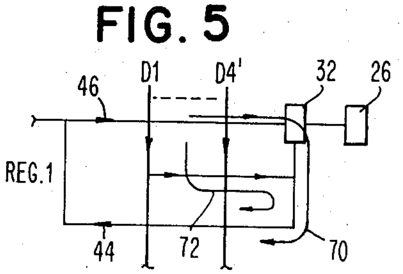

CYLINDRICAL MAGNETIC DOMAIN DECODER

BACKGROUND OF THE INVENTION

1. Field of the Invention

This invention relates to decoders for shift registers using cylindrical magnetic domains and more particularly to such a decoder having a clear means for clearing selected shift registers when new information is to be written into those registers.

2. Description of the Prior Art

Cylindrical magnetic domains are known in the art as can be seen by referring to U. S. Pat. No. 3,460,116. These domains are localized regions whose magnetization is opposite to that of the magnetic sheet in which they exist and is directed normal to the plane of the sheet. These are single wall domains which are not bounded by the edges of the magnetic sheet. The magnetic sheet is characterized by a uniaxial anisotropy and an easy axis normal to the plane of the magnetic sheet.

As is apparent from this reference, such domains can be propagated in a magnetic sheet. The domains can be split (replication), can be created within the magnetic sheet (writing), can be sensed (reading), and can be destroyed (clearing). Copending application Ser. No. 103,046, filed Dec. 31, 1970 and assigned to the present assignee, describes these functions.

The aforementioned Ser. No. 103,046 describes a complete on-chip memory using cylindrical magnetic domains. The writing function, reading function, storage function, and decoding functions are provided on a single magnetic sheet thereby requiring only a minimum number of interconnections. In particular, the magnetic field required for propagation of the domains is used to perform these other functions also. The decoder of Ser. No. 103,046, while particularly advantageous for a completely magnetic memory, does not include means which would enable the information from any selected shift register individually to be cleared in order to write new information into that register. In order to provide a complete decode function, clearing means is required. In addition, it is advantageous if the decoding for the clearing function (along with the decoding for write and read) can be provided with a minimum number of interconnections and within a minimum area of the magnetic sheet.

Accordingly, it is a primary function of this invention to provide a decoder for cylindrical magnetic domain shift registers which has a means for clearing information from selected registers.

Another object of this invention is to provide a decoder for cylindrical magnetic domain shift registers which has a clearing means to clear information from selected registers, said clearing means being a single unit operable to clear all registers.

Still another object of this invention is to provide a decoder for cylindrical magnetic domain shift registers in which a single clearing means is used to clear information from all registers or from any selected register, in order to provide destructive or non-destructive readout of selected registers.

A further object of this invention is to provide a decoder for cylindrical magnetic domain shift registers which is capable of selecting a shift register for clear, write, and/or read using a minimum number of interconnections and within a minimum area of the magnetic sheet.

BRIEF SUMMARY OF THE INVENTION

This magnetic sheet memory includes storage means for magnetic domains and a read decoder, in addition to writing means and detecting means for cylindrical magnetic domains selectively read from the storage means. Here, the presence and absence of domains is indicative of binary information. The decoder also includes clearing means for selective removal of information from any storage means to enable the writing of new information into the selected storage means.

In more detail, a magnetic sheet, such as an orthoferrite or a garnet, contains cylindrical magnetic domains. A bias field $H_z$ exists normal to the plane of the magnetic sheet, and is provided by a bias field source such as an external coil. In addition, the bias field can be established by a permanent magnet (U.S. Pat. No. 3,508,221) or by an additional magnetic layer deposited on the magnetic sheet (as shown in U. S. Pat. No. 3,529,303). A plurality ($2^N$) of closed-loop shift registers (storage means) move the cylindrical domains in closed paths through the magnetic sheet. In a particular case, the closed loops are provided by permalloy patterns which function as the propagation means together with an inplane, rotating magnetic field H. Propagation means other than permalloy patterns can be used, such as conductor loops. A field control circuit controls the operation of the bias field source and the propagation field (H) source.

Connected to each shift register is a write source for writing new data into each shift register at selected intervals.

A read decoder comprising conductor loops overlying the shift registers is provided for selecting particular shift registers for data readout. The read decoder has 2N inputs which are derived from a decoder pulse source. Depending upon the inputs present, any of the $2^N$ shift registers will be selected for sensing the information in those shift registers. Of course, the decoder could be used as a write decoder, if desired.

A clear means, activated by a clear means source, is a portion of the decoder and is provided for directing domains from selected shift registers into one of two paths. One path leads to a detector for destructive readout of the information in the selected shift register, while the other path leads to a domain splitter. One such splitter is associated with each of the shift registers. Domains which enter the domain splitters are divided into two new domains, one of which goes to the detector while the other is returned to the associated shift register. A control circuit is connected to the write sources, decoder pulse source, and clear means source for selectively activating these units.

A utilization circuit connected to the detector uses the outputs of the detector for further processing as desired.

In operation, any of the $2^N$ shift registers is selected for readout by the signals applied to the read decoder. After selection of the read decoder, the domains in a selected shift register are directed through the clear means. Depending upon the activation of the clear means by the clear means source, the domains in the selected shift register will follow one of two paths. One path will lead to the detector where there is destructive readout, while the other path will lead to devices providing nondestructive readout. These devices are the domain splitters associated with each shift register.

The domains will be split into two new domains by the splitters, one new domain going to the detector for destructive readout and the other being returned to the appropriate shift register for continued circulation.

The clear means is a single means which is associated with all shift registers, rather than being a plurality of means one of which is associated with each register. Thus, simplicity of layout and more optimum use of the area of the magnetic sheet is obtained.

This decoder will clear the registers and also provide read decoding. In addition, only a small portion of the magnetic sheet is used, and the decoder is integrated with the shift register loops in contrast with the decoder of aforementioned Ser. No. 103,046.

The foregoing features, advantages, and objects will be apparent from the following, more particular description of the preferred embodiments.

BRIEF DESCRIPTION OF THE DRAWINGS

FIG. 3 is a logic table describing the input to the memory system of FIG. 2 for selective decoding and clearing of information in the memory.

FIG. 4 is a detailed diagram of a portion of the circuit of FIG. 2, showing the particular propagation means and input selectors used to provide selective decode and clearing. FIG. 5 illustrates a system for equalizing the delay times associated with the decoding function.

DETAILED DESCRIPTION OF THE PREFERRED EMBODIMENTS

Figure 1:
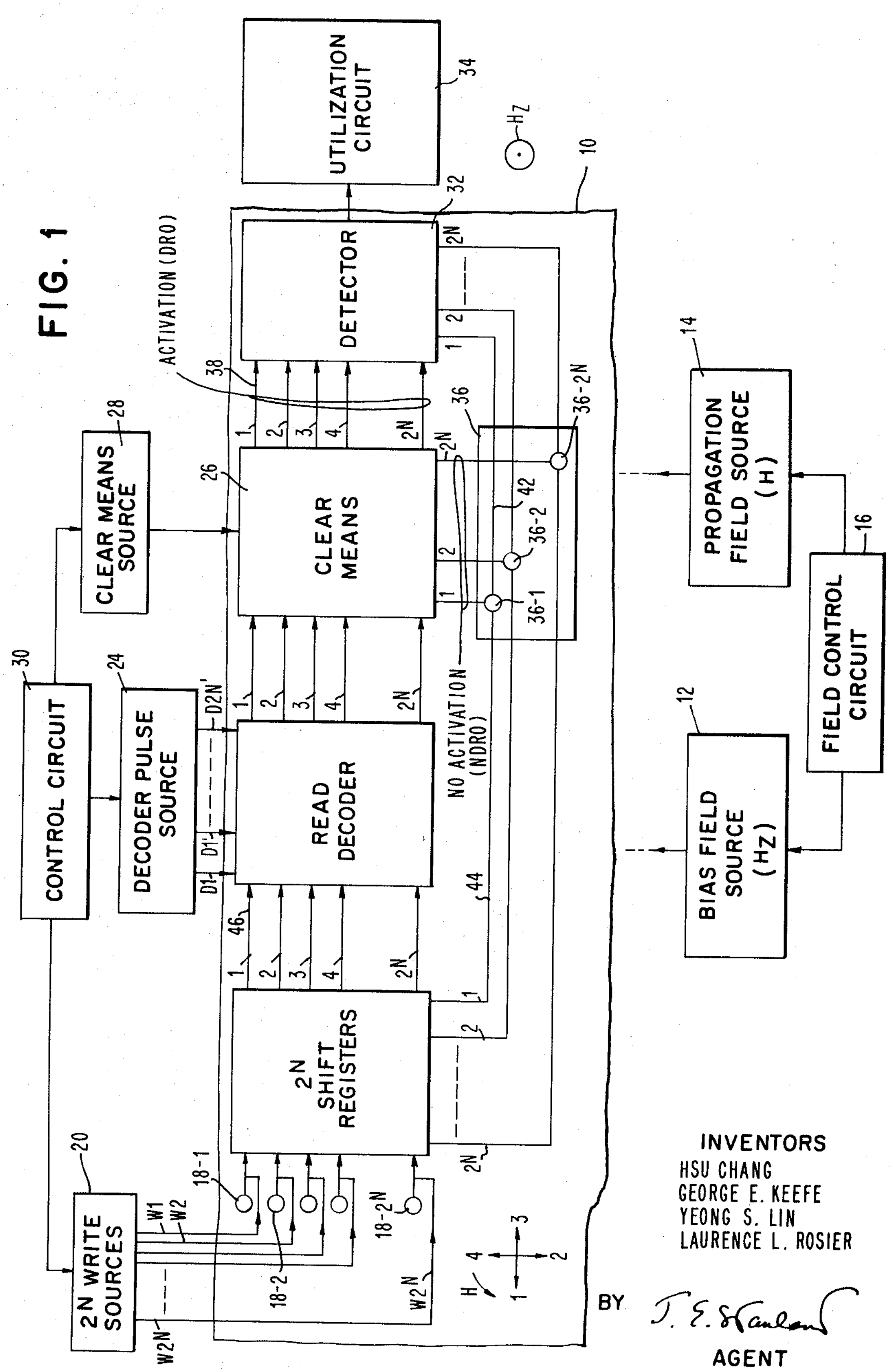
FIG. 1 is a block diagram of the memory system having write, storage, decoding, and sensing.

FIG. 1 shows a block diagram of a memory system using cylindrical magnetic domains which provides writing, storage, decoding, clearing, and sensing. A magnetic sheet 10, such as garnet or orthoferrite, has a bias magnetic field $H_z$ normal to its plane for maintaining the diameter of cylindrical magnetic domains in magnetic sheet 10. The bias field $H_z$ is provided by the bias field source 12 which can be an external coil. If desired, the bias field can be provided by a permanent magnetic layer or by a second magnetic sheet exchange coupled to the magnetic sheet 10, as previously mentioned.

When domains are to be moved by permalloy patterns, a propagation field H is provided by propagation field source 14. Propagation field H is a rotating, in-plane magnetic field which establishes attractive and repulsive magnetic poles along the permalloy patterns for movement of the domains. Propagation field source 14 can be comprised of external coils located around magnetic sheet 10 which are alternately pulsed to provide a magnetic field H along the directions 1, 2, 3, and 4. While the invention will be explained in terms of a permalloy pattern, it will be readily understood by those skilled in the art that other propagation means, such as conductor loops, could be used as well. The bias field source 12 and propagation field source 14 are activated by the field control circuit 16, which provides current to the sources 12 and 14 for establishing the bias field $H_z$ and the propagation field H.

Domains move in closed paths in each of the $2^N$ shift registers. The domains are representative of binary information, the presence of the domain being indicative of a binary 1 while the absence of a domain is indicative of a binary 0, for instance. Associated with each shift register 1, 2, . . ., $2^N$ is a domain generator 18–1, 18–2, . . . 18–$2^N$. These generators write information into the shift registers in accordance with the inputs provided by the write pulse sources 20 on lines W1, W2, . . . W$2^N$. If desired, a write decoder can be used with the domain generators 18–1, etc. to insert information into selected shift registers, as is shown in aforementioned Ser. No. 103,046.

A read decoder 22 is associated with the shift registers. The read decoder receives 2N inputs derived from a decoder pulse source 24. Depending upon the inputs supplied to read decoder 22, any or all of the $2^N$ shift registers can be selected for information readout.

After selection by the read decoder 22, information in the selected register passes through a clear means 26 which is activated by a clear means source 28. The clear means source 28, decoder pulse source 24, and write pulse sources 20 are under selective control of control circuit 30, which provides inputs to each of these sources to activate them at the proper time. Clear means 26 sends the domains in the selected shift register into one of two paths, depending upon whether the information is to be read out destructively or non-destructively. If destructive readout is to be used, domains in the selected register are passed directly to detector 32, which could be a magnetoresistive sensing element, and inductive loop, a magneto-optic sensing device, or other means of detection. Associated with the detector is a domain collapser which destroys the domains. If desired, the detector could be a conductor loop having current passing therethrough which collapses the domains to sense the flux change upon domain collapse. The output of the detector 32 goes to the utilization means 34, which can be any external circuitry using the binary information contained in the selected shift register.

If non-destructive readout is desired, the clear means 26 will direct the domains from a selected register to a domain splitter 36–1, or 36–2, . . ., 36–$2^N$. The splitter divides input domains into two portions, one of which travels to the detector 32 for destructive read-out while the other travels back to the selected shift register for continued circulation in that shift register loop.

In FIG. 1, the shift registers, read/write decoder 22, and clear means 26 are shown as separate, distinct components for ease of understanding, but it should be understood that the decoder, having a clear means, is integrated into the shift register. Consequently, the lines 46 and 44 represent the shift register loops 1, 2, . . ., $2^N$ which are intersected by the decoder 22 which includes the clear means 26.

The block diagram of FIG. 1 shows a complete cylindrical domain memory system in which information is selectively written into $2^N$ shift registers for storage therein. The information content of the shift registers can be selectively addressed by inputs to the read decoder 22. Then, depending upon the activation of clear means 26, domains in selected registers will be destructively or non-destructively read. If destructive readout is indicated by the clear means, domains in selected registers are destructively read out by a detector 32. During destructive readout, a control circuit 20 activates the write pulse source 20 which in turn activates the domain generators 18–1, 18–2, . . . .,18–$2^N$ associated with the register which is destructively read. Thus, new information is written into the destructively read shift register.

If the clear means indicates that information is to be non-destructively read from the selected shift register, the domains from that shift register are directed to a domain splitter where they are divided into two new domains. One of the new domains goes to detector 32 for destructive readout, while the other is brought back to the selected shift register for continued circulation in that shift register.

Figure 2:
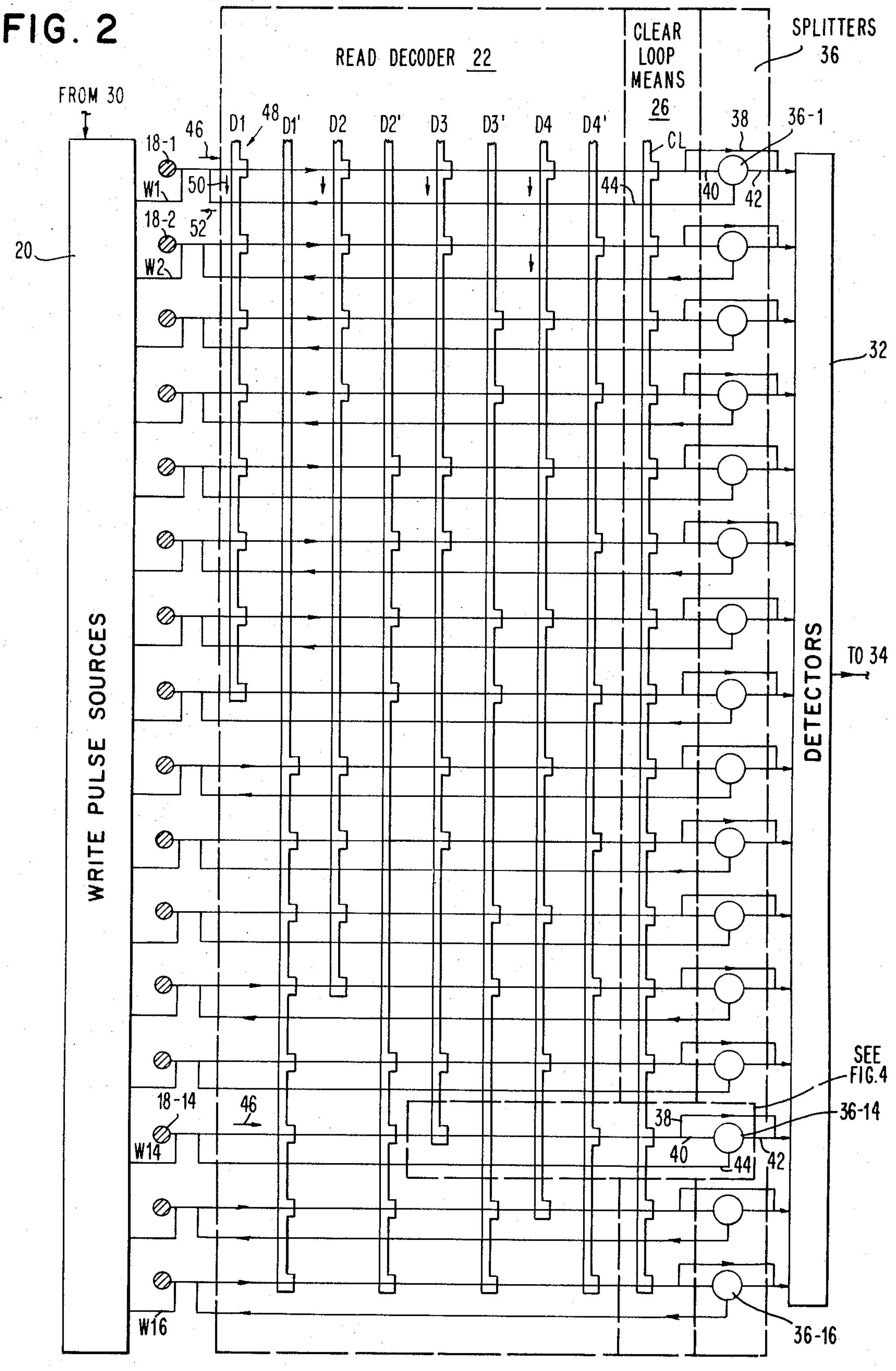
FIG. 2 is a circuit diagram which shows in more detail the memory of FIG. 1.

FIG. 2 shows a more detailed diagram of the shift registers (1–16 here), decoder, clear means, splitters, and detector of FIG. 1. Magnetic sheet 10 (not shown here) contains a plurality of closed loop propagation paths for shift registers 1, 2, . . ., 16. At the input to each shift register loop is a domain generator 18–1, 18–2, . . . ., 18–16. These generators continually produce domains which are entered into the shift register loops 1–16 depending upon the activation of write pulse sources 20. Thus, a 1, 0 control loop (W1, W2, . . .W16) is used in conjunction with each domain generator 18–1, etc. to provide information to the shift register loops.

The read decoder 22 is comprised of a series of control loops D1, D1′, D2, . . .D2N′ which intercept the shift register loops. Current inputs in these control loops cause variations in the localized magnetic field in the regions where the loops are widest, as will be explained more fully in connection with FIG. 4. Depending upon the inputs to decoder loops D1–D4′, the content of any shift register is directed to the clear means 26, rather than recirculating in the direction of the arrows. The clear means 26 is comprised of a single clear loop CL which is associated with all shift registers. Currents are provided in clear loop CL by clear means source 28 (FIG. 1). Depending upon whether or not clear loop CL is activated, domains in the register selected by the read decoder will be destructively or non-destructively read. If the clear loop is activated, domains in a selected register will follow path 38 to a detector 32 for destructive readout. On the other hand, if clear loop CL is not activated, domains in a selected register will follow path 40 to a splitter 36–1, 36–2, . . .,36–16. The splitter will divide the domains into two parts, one part travelling via path 42 to detector 32 for destructive readout, the other travelling via path 44 for recirculation in the shift register.

As explained previously, write pulse source 20, under control of control circuit 30 will cause new information to be written into the shift register whose contents are being destructively read. That is, domain generators 18–1, 18–2, . . .18–$2^N$ will send domains into those registers which have been destructively read.

FIG. 3 shows a logic diagram for operation of the circuit of FIG. 2. Depending upon the binary inputs present to the read decoder 22, a selected shift register will have its content read either destructively or non-destructively depending upon the activation state of clear loop CL. For instance, to read the content of shift register 1, the inputs applied to loops D1, D1′, . . .D4′ are 01010101. In this case, a "0" means that no current pulse is applied to a decoder current loop, while a "1" means that a current pulse is applied to a decoder loop. The presence of a current pulse in a decoder loop will cause a localized magnetic field which diverts a domain from its path toward the right downwardly to a return path heading to the left. For instance, the control loop D1 crosses the propagation path indicated by arrow 46 in region 48. If a current pulse is present in loop D1, domains travelling along path 46 will be deflected downwardly (arrow 50), and will be recirculated along the path indicated by arrow 52. If current pulse is present in loop D1, the domains will continue to the right along path 46. As will be noted, decode loop D1′ does not contain a widened portion where it crosses propagation path 46 of register 1. Therefore, current in this loop will not affect the direction of domains moving along path 46.

If the inputs 01010101 are present in decode loops D1–D4′, the contents of shift register 1 will continue along path 46 to the region of intersection of clear loop CL. Depending upon the presence or absence of a current input in loop CL, the contents of shift register 1 will be moved along either path 38 or path 40. Propagation along path 38 will bring the domains in shift register 1 to detector 32 where they are destructively read. If there is no activation of clear loop CL, the domains will travel along path 40 to domain splitter 36–1. This splitter will divide the domains into two parts, one of which passes along path 42 to detector 32 for destructive readout. The other domain will follow path 44 for recirculation in shift register 1.

When domains from shift register 1 are propagated along path 38 for destructive readout, control circuit 30 provides a clock pulse to write pulse source 20 which in turn provides the appropriate output in loop W1 for entering new data into shift register 1. That is, domain generator 18-1 (which can be a conventionally known permalloy disk on which a "mother" domain travels) provides continual domains during each cycle of propagation field H. Current inputs in loop W1 allow the "mother" domain to split and pass into shift register 1 or prohibits splitting so that no domain enters shift register 1, depending upon the information to be written into the shift register. The operation of the write pulse source 20 and the domain generators 18–1,..., 18–16 is also discussed in aforementioned Ser. No. 103,046.

If non-destructive readout occurs, write pulse source 20 is not activated by control circuit 30. Domains which have been split by splitters 36–1 will recirculate in shift register 0.

Selection of any or all shift registers for destructive or non-destructive readout is possible in accordance with the binary inputs applied to read decoder 22. In FIG. 2, a portion of shift register 14 is outlined in phantom lines and is shown in more detail in FIG. 4 (the magnetic sheet 10 is not shown here). Thus, the individual propagation elements used to provide shift register paths and the splitter are shown in more detail in FIG. 4, which will now be explained. In this figure, the same reference numerals will be used, where possible.

Domains, such as 53, travel to the right in the direction of arrow 46 in shift register 14. It is to be understood that most of the shift register loop is not shown, and that the loop extends further to the left, to accomodate decoder loops D1–D2′ and to provide sufficient storage. In accordance with well know principles, the rotating propagation field H creates attractive poles in T and I bar permalloy elements 54 for movement of domains in the direction of arrow 46. Deposited on magnetic sheet 10 and over selected permalloy elements 54 are conductors used for decode loops D3, D3', D4, and D4'. Also deposited on magnetic sheet 10 and on the appropriate permalloy elements 54 is the clear loop CL, which is also a conductor loop (such as copper). As is apparent, decode loops D3 and D4' have widened portions in the areas where they intersect T bar elements in path 46, while decode loops D3' and D4 do not have widened portions where they pass T bar elements in path 46. This means that currents in decode loops D3' and D4 will not affect the passage of domains along path 46.

Also deposited on magnetic sheet 10 is a permalloy domain splitter 36–14 which in this case comprises a top permalloy overlay and a bottom permalloy overlay, which is shown in dashed lines. Operation of a permalloy splitter of this type is described in aforementioned Ser. No. 103,046.

Using the binary inputs shown in FIG. 3 for selective readout of shift register 14, no current is present in decode loops D3 and D4'. As mentioned previously, currents in decode loops D3' and D4 do not influence operation of shift register 14. Consequently, domains 53 propagate in the direction of arrow 46 to pole position 2 of T-bar 56. After this, domain 53 will either follow the path indicated by arrows 38 or the path indicated by arrow 40. If clear loop CL is activated by a current pulse, no attractive magnetic pole will be created at pole position 3' of element 56. Therefore, domains located at pole position 2 of element 56 will be attracted upwardly to pole position 4 of element 56 when propagation field H is in direction 4. After this, the domains will move to pole position 1'' on T-bar 58 when propagation field H is in direction 1. Movement in the direction of arrow 38 will continue as H rotates, bringing domains to detector 32 for destructive readout.

Detector 32 is shown conveniently as a magneto-resistive detector in conjunction with a domain buster 60. Magnetoresistive sensing detector 32 is comprised of a magnetoresistive sensing element 62 and a constant current source 64. As explained in copending application Ser. No. 78,531, filed Oct. 6, 1970 and assigned to the present assignee, the magnetization vector of sensing element 62 will be rotated when the stray magnetic field of a domain 53 interacts with it. This will cause a resistance change in sensing element 62, which is manifested as a voltage signal $V_s$.

Domain buster 60 comprises an elongated permalloy pattern 66 to which domains 53 travel after being sensed when H rotates to direction 4, domains 53 move to pole position 4 on element 66. As H rotates, domains 53 move to the corner of element 66, and are trapped there even when H rotates to position 3, since pole position 3 is far from the corner of element 66. When H is in position 3, the localized field at the corner becomes repulsive, and domains collapse.

If no current pulse exists in clear loop CL when domains 53 are located at pole position 2 of element 56, these domains will propagate along the path indicated by arrow 40 as propagation field H rotates. Thus, the domains will be brought to domain splitter 36–14. As mentioned previously, this splitter comprises a top permalloy overlay indicated by the solid T and I bars and a bottom permalloy overlay indicated by the dashed elements. Under the action of the rotating propagation field H, domains 53 which enter splitter 36–14 are divided into two portions. One portion travels towards detector 32 via the bottom overlay following attractive poles *a–b–c* (in the direction of arrow 42). After this, these domains follow paths 38 to the detector.

The other portion of the split domain moves to sequential pole positions *a'–b'–c'* on element 68 as propagation field H rotates. These domains follow the path indicated by arrows 44 for recirculation in shift register 14.

In this memory system, it is quite possible to have different delay times associated with the decoding function, depending on which register is to be read. While this does not mean that the decoder as shown is inoperable, avoidance of the different delay times for different registers is desireable. To achieve this, the path followed by the domains during the decoding operation have equal lengths, whether the domains are to be read or not.

FIG. 5 illustrates this delay equilization more clearly. A single register (in this case register 1) is shown having current decode loops D1–D4' integrated with the register. (This same technique would be applied to all registers, although they are not shown here.) In this scheme, the path followed by a domain when it is sensed (indicated by arrow 70) has the same length as the path (indicated by arrow 72) followed by the domain when it is not sensed. Therefore, the delays associated with the read operation are the same as those when domains are not to be read.

In FIG. 5, the clear means 26 is located after the detector 32, which is reverse to that shown previously. In this arrangement, the splitters 36–1, . . .,36–2$^N$ are not required, since detector 32 provides NDRO, and domains which are not to be cleared do not travel to clear means 26.

If domains are to be cleared, the control circuit 30 provides a signal pulse to write pulse sources 20 to initiate a domain writing operation while the clearing operation is occurring. If desired, the same current input lines can intercept a decoder associated with the generators 18–1, . . .18–2$^4$ to perform domain writing into selected shift registers.

Although permalloy patterns have been shown for propagation of domains, it is readily understood that conductor loop patterns could also be provided, as could angelfish wedge patterns. Further, the writing means and the sensing means could be varied without departing from the concept outlined in this invention.

What has been described is an improved decoder for cylindrical magnetic domain shift registers having a clearing means for removal of domains in a selected register in order to provide room for new information in this register. The clearing means comprises a single clear loop which is used with all the shift registers. This provides a simple and efficient clear function without requiring a significant portion of the magnetic sheet in which the domains are propagated and stored.

What is claimed is:

1. An apparatus for cylindrical magnetic domains, comprising:

a magnetic sheet in which said domains can be propagated;

bias means for stabilizing said domains in said sheet;

storage means for storing information as the presence and absence of said domains;

decoder means integrated with said storage means for selecting any of said storage means for information readout;

sensing means for sensing domains in selected storage means, thereby providing information readout of said storage means;

means for returning said domains to said selected storage means after sensing by said sensing means;

clear means associated with said storage means for removing information from said selected storage means thereby providing room in said selected storage means for new information;

writing means associated with each said storage means for writing new information into said selected storage means upon removal of information from said selected storage means by said clear means.

2. The apparatus of claim 1, where said clear means is comprised of a current loop which is associated with all said storage means, the presence and absence of current in said loop determining whether said domains are removed from said selected storage means.

3. The apparatus of claim 1, where said decoder means is comprised of a plurality of current loops associated with said storage means, the presence and absence of currents in said decoder determining which of said storage means is to have its information sensed.

4. The apparatus of claim 1, further including control means for activating said decoder, said clear means, and said writing means to initiate information readout, clearing, and regeneration of information in selected storage means.

5. The apparatus of claim 1, where each said storage means is comprised of a shift register in which said domains propagate, said decoder and clear means being located on said magnetic sheet and intercepting each said shift register, current pulses in said decoder and said clear means affecting propagation of said domains in said shift register.

6. The apparatus of claim 1, where said means for returning said domains includes domain splitters for splitting said domains into a plurality of new domains, one of said new domains being returned to said storage means.

7. The apparatus of claim 1, further including domain busters located on said magnetic sheet for destroying domains from selected storage means when said information is removed from said storage means by said clear means.

8. An apparatus for cylindrical magnetic domains, comprising:

a magnetic sheet in which said domains can be propagated;

bias means for stabilizing the diameter of said domains;

a plurality of propagation paths on said sheet for moving said domains within said sheet;

drive means associated with said propagation paths for moving said domains along said propagation paths;

decoder means associated with said propagation paths for selectively diverting said domains from said paths;

sensing means for sensing the presence and absence of said domains in selected paths;

clear means associated with said propagation paths and with said decoder for directing domains from selected propagation paths into one of two paths depending on the activation of said clear means, said clear means removing domains from said selected propagation paths in response to activation of said clear means;

means for returning said domains to said selected propagation paths if said clear means is not activated.

9. The apparatus of claim 8, where said clear means is a current loop that crosses each said propagation path, current pulses in said loop changing the direction of propagation of domains in said selected propagation paths.

10. The apparatus of claim 8, further including writing means for generating domains in selected paths, said writing means being activated when said clear means is activated to generate domains in those paths from which domains are removed; and control means connected to said clear means and to said writing means for activating said clear means and said writing means thereby controlling removal of domains and writing of domains.

11. The apparatus of claim 8, further including means for destroying domains which are removed from said selected propagation paths by said clear means.

12. The apparatus of claim 8, where said decoder means is comprised of a plurality of current loops which cross said propagation paths, current in said decoder loops changing the direction of propagation of domains in selected paths.

13. An apparatus for cylindrical magnetic domains, comprising:

a magnetic sheet in which said domains can be propagated;

bias means for stabilizing the diameter of said domains;

a plurality of propagation paths for said domains, said domains moving along said paths in response to applied drive pulses;

drive means for providing said drive pulses to move said domains along said paths;

decode means comprising a plurality of current loops located adjacent said magnetic sheet and crossing said paths, current in said loops changing the effect of said drive pulses on said propagation, for passing domains in selected paths to a sensing means;

sensing means for detection of domains from paths selected by said decoding means;

propagation means for returning said detected domains to their associated selected propagation paths, said propagation means moving said detected domains in response to said drive pulses;

clear means comprising a further current loop located adjacent said magnetic sheet and crossing each said propagation path, current in said clear means loop changing the effect of said drive pulses on domain propagation in those paths which have been selected by said decoder means, said clear loop removing said domains from said propagation paths when suitably activated;

writing means for generating domains in selected paths in response to control pulses applied thereto; and control means connected to said clear means and to said writing means for applying said control pulses thereto.

14. The apparatus of claim 13, further including domain collapsers for destroying domains which have been removed from selected paths by said clear means.

15. The apparatus of claim 13, where said propagation paths are defined by magnetically soft patterns deposited on said magnetic sheet and said drive pulses are magnetic pulses in the plane of said magnetic sheet.

16. The apparatus of claim 13, where said propagation paths are closed loops in which said domains circulate in response to application of said drive pulses, said decoder current loops intersecting said closed loop propagation paths.

17. An apparatus for cylindrical magnetic domains, comprising:

a magnetic sheet in which said domains can be propagated;

bias means for stabilizing the diameter of domains in said sheet;

storage means comprising a plurality of propagation means arranged in closed loops in which said domains propagate in response to application of drive pulses to said propagation means;

drive means for applying said drive pulses to said propagation means;

writing means for generating domains in selected closed loops;

decoder means for directing domains in selected closed loops to a sensing means, said decoder means being comprised of a plurality of current loops which cross said propagation means, current in said decoder loops changing the effect of said propagation means on said domain propagation at those regions where said decoder loops cross said propagation means;

sensing means for detecting domains from said selected closed loops, clear means for removing domains from selected closed loops, said clear means being comprised of a further current loop which crosses said propagation means, current in said further current loop changing the effect of said drive pulses on said propagation means in those regions where said further current loop crosses said propagation means;

control means for selectively applying current pulses to said decoder current loops, said clear means, and said writing means for generation of domains in those closed loop storage means from which domains are removed by said clear means; and domain busters for destroying domains removed from selected closed loops by said clear means.

18. The apparatus of claim 17, further including domain splitters associated with each closed loop for splitting domains from closed loops selected by said decoder current loops, said splitters producing two new domains one of which is propagated to said selected closed loop while the other is propagated to said sensing means and to said domain busters.

19. The apparatus of claim 17, where said propagation means are magnetically soft elements deposited on said magnetic sheet and said decoder current loops and said further current loop are conductors deposited adjacent said magnetically soft elements.

20. The apparatus of claim 17, where said further current loop is a single conductor which crosses each said closed loop storage means.

* * * * *